US006648129B2

United States Patent
Sedlacek

(12) United States Patent
(10) Patent No.: US 6,648,129 B2
(45) Date of Patent: Nov. 18, 2003

(54) ABRASION-RESISTANT TWO-MATERIAL HINGE PIN IN A MODULAR PLASTIC CONVEYOR BELT

(75) Inventor: Kyle J. Sedlacek, New Orleans, LA (US)

(73) Assignee: The Laitram Corporation, Harahan, LA (US)

(*) Notice: Subject to any disclaimer, the term of this patent is extended or adjusted under 35 U.S.C. 154(b) by 0 days.

(21) Appl. No.: 10/011,024

(22) Filed: Nov. 8, 2001

(65) Prior Publication Data
US 2003/0085107 A1 May 8, 2003

(51) Int. Cl.[7] .................................. B65G 17/06
(52) U.S. Cl. .................... 198/850; 198/851; 198/852; 198/853; 198/957
(58) Field of Search .................. 198/850, 851, 198/852, 853, 957

(56) References Cited

U.S. PATENT DOCUMENTS

| 4,023,239 A | * | 5/1977 | Stolz | 198/851 |
| 4,024,605 A | * | 5/1977 | Henke | 16/168 |
| 4,195,887 A | * | 4/1980 | Ruddell | 198/853 |
| 5,125,874 A | * | 6/1992 | Fryer et al. | 474/214 |
| 5,573,106 A | * | 11/1996 | Stebnicki et al. | 198/853 |
| 5,678,683 A | * | 10/1997 | Stebnicki et al. | 198/853 |
| 5,957,268 A | * | 9/1999 | Meulenkamp | 198/850 |
| 6,036,002 A | * | 3/2000 | Kobayashi et al. | 198/853 |
| 6,164,439 A | | 12/2000 | Stebnicki et al. | |
| 6,419,073 B1 | * | 7/2002 | Piron | 198/370.03 |
| 6,439,378 B1 | * | 8/2002 | MacLachlan | 198/850 |

FOREIGN PATENT DOCUMENTS

EP 0947450 A1 10/1998

* cited by examiner

Primary Examiner—Douglas Hess
(74) Attorney, Agent, or Firm—James T. Cronvich

(57) ABSTRACT

A two-material hinge pin for hingedly interconnecting consecutive rows of belt modules together into a modular plastic conveyor belt. The hinge pin includes an interior rod surrounded by an outer tube. The interior rod is made of a rigid material, such as acetal, nylon, polypropylene, PVC, or steel. The outer tube is made of urethane, which provides inherent abrasion resistance in contact with the belt modules and is especially effective in abrasive environments.

18 Claims, 2 Drawing Sheets

ABRASION-RESISTANT TWO-MATERIAL HINGE PIN IN A MODULAR PLASTIC CONVEYOR BELT

BACKGROUND

Figure 1:
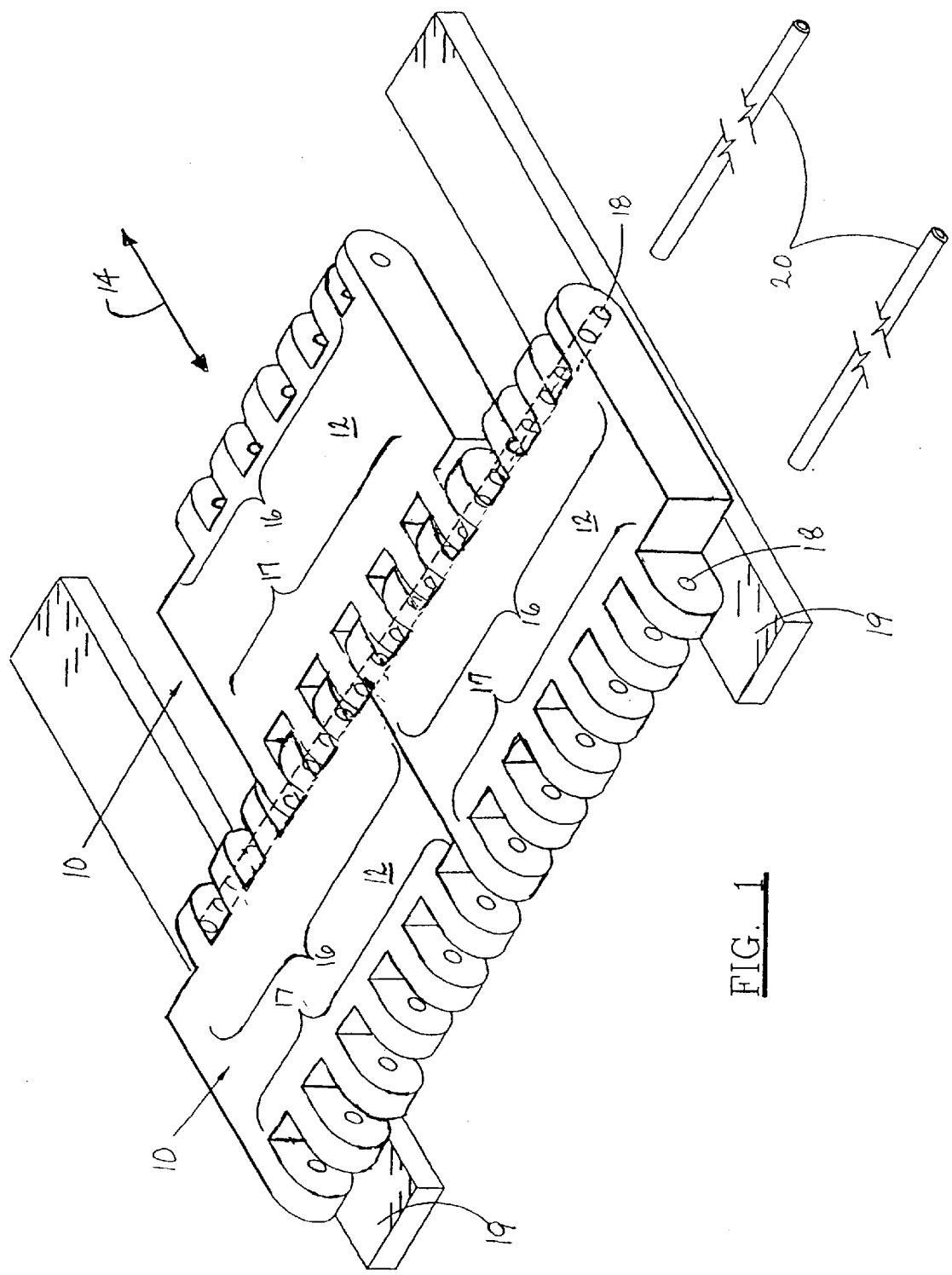

The invention relates to modular plastic conveyor belts and, more particularly, to two-material hinge pins for connecting consecutive belt rows together.

Because they do not corrode and are easy to maintain, modular plastic conveyor belts are widely used in many industries to convey articles. These belts, or chains, typically are constructed of a series of rows of one or more belt modules connected end to end into an endless conveyor belt. Each row includes spaced apart hinge elements at each end with apertures formed through the hinge elements. The hinge elements along one end of a row are interleaved with the hinge elements along an end of an adjacent row. The apertures of the interleaved hinge elements are aligned and form a passageway for a hinge pin. A hinge pin inserted in the passageway serves to connect the rows together and to allow them to pivot about the axis of the pin so that the belt can backflex or articulate about a drive sprocket. But rubbing contact between the hinge elements and the confined hinge pins causes both to wear. This wear is, of course, exacerbated in abrasive environments in which dirt and grit can make their way between the contact surfaces of the pins and the hinge elements.

Various techniques have been used to adapt modular plastic conveyor belts to abrasive conditions. For example, steel hinge pins are used to increase wear life. But steel pins are expensive and add significantly to the weight of the belt. As another example, soft urethane hinge pins have been used. But soft urethanes, while wear-resistant, do not make strong hinge pins as are required in all but extremely light-duty applications. Other solutions depart from using standard cylindrical hinge pins and instead use non-circular pins in the shape of flat strips that do not rotate relative to the hinge elements, but rather bend along their length as a living hinge. But these hinge pins must also be made out of a flexible material that does not offer much shear strength and is limited to use in lightly loaded applications. Furthermore, the apertures in the hinge elements must be shaped in a non-standard way to receive the hinge strips.

Thus, there is a need for a hinge pin that combines strength and abrasion-resistant properties for use in modular plastic conveyor belts operated especially in abrasive environments.

SUMMARY

This need and others are satisfied by a hinge pin having features of the invention. The hinge pin for use in hingedly interconnecting adjacent rows of a modular plastic conveyor belt into an endless belt includes a rigid interior rod surrounded by a soft outer tube. The rod is preferably made of a rigid material, such as acetal, nylon, polypropylene, PVC, or steel, for high belt strength. The tube is preferably made of a soft urethane material. With the hinge pin journalled in passageways formed by aligned apertures in the interleaved hinge elements along adjacent rows of belt modules, the tube contacts the walls of the apertures. Testing has shown that the wear normally caused by the relative motion between the tube and the aperture walls is significantly less for a rod covered with a urethane tube. The combination of the strength of the rod and the natural abrasion-resistant properties of the urethane tube make for a strong, abrasion-resistant belt.

DRAWINGS

Figure 2:
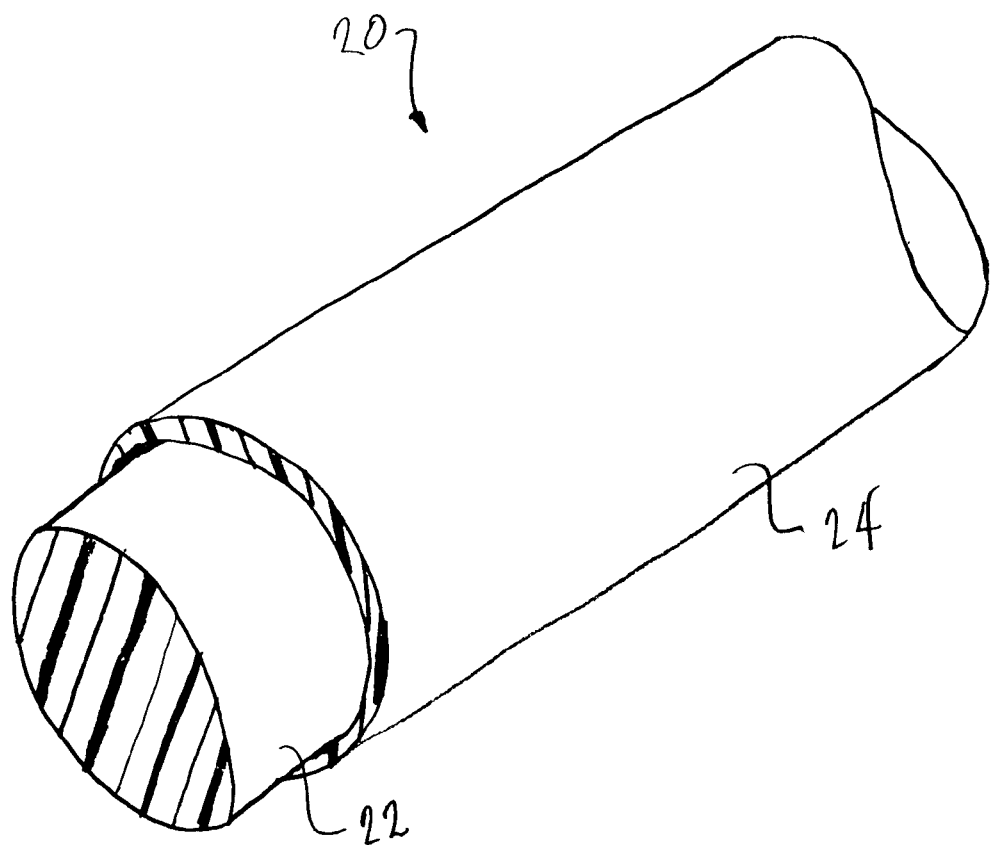

These and other features, aspects, and advantages of the invention are described in more detail in the following description, appended claims, and accompanying drawings, in which:

FIG. 1 is an isometric view of a portion of a modular plastic conveyor belt connected by hinge pins embodying features of the invention; and FIG. 2 is an isometric cross section view, partly cut away, of the hinge pin of FIG. 1.

DETAILED DESCRIPTION

A portion of a modular plastic conveyor belt connected by hinge pins embodying features of the invention is shown in FIG. 1. The belt includes a series of rows 10 of belt modules 12. Each belt module extends from a first end to a second end in a direction of belt travel 14. Each module includes a first set of hinge elements 16 along the first end and a second set of hinge elements 17 along the second end. Each of the hinge elements further has an aperture 18 formed therethrough. The apertures of each set are aligned across the width of the module. The modules are typically formed by injection-molding and made of a thermoplastic material such as polypropylene, polyethylene, acetal, nylon, or a composite material that may include non-plastic fibers for strength, for example. Belts made of such modules are manufactured and sold, for example, by Intralox, Inc. of Harahan, La., USA.

The modular plastic conveyor belt is assembled by interleaving the first set of hinge elements of a row with the second set of hinge elements of an adjacent row. Each row can include one or more modules. When more than one module is used in each row, the modules are positioned side by side in the row and end to end with the modules of adjacent rows typically in a brick-lay pattern and supported on wearstrips 19. The aligned apertures of the interleaved hinge elements form a passageway between each row across the width of the belt. Hinge pins 20 are inserted into the passageways to interconnect the modules of one row to those of an adjacent row and to form with the hinge elements a hinge joint between adjacent rows. The belt can articulate about a drive sprocket or drive at the hinge joints.

When the belt is driven, the modules and their hinge elements are in tension. This tension is transferred from row to row through the hinge pin. Furthermore, as the belt articulates about a drive sprocket or backflexes, there is a lot of rubbing contact between the outside of the hinge pin and the wall of the apertures in which it is confined. The rubbing frictional contact wears both the pin and the hinge element, especially in abrasive environments. The preferred hinge pin 20 shown in more detail in FIG. 2 addresses both these problems. The hinge pin includes an interior rod 22 surrounded by an outer tube 24. The rod is shown circular in cross section, but could be other shapes, such as oval, for example. To give the hinge pin strength and prevent it from thinning out or elongating under belt tension or high temperature, the rod is manufactured out of a rigid thermoplastic material, such as acetal, nylon, polypropylene, PVC, or steel. A rigid material is defined here as a material with a flexural modulus greater than 100,000 psi, as defined in ASTM D790. The rod can be made by extrusion or by injection-molding, for example. Although these rigid thermoplastic materials are excellent for strength, their abrasion-resistant properties are not ideal and can cause accelerated wear of the hinge elements, as well as of the rod itself. In the preferred version of the invention, the outer tube of the hinge pin is made of a soft urethane, which tests have shown has excellent abrasion-resistant characteristics. The results of tests of various hinge pins are summarized in Table I.

TABLE I

| Hinge Pin Material | Percent Elongation in Pitch |
| --- | --- |
| Acetal | 9.89% |
| Polypropylene | 8.16% |
| Nylon | 2.84% |
| Urethane Tube/ Acetal Interior Rod | 0.68% |

The test procedure was as follows. Modular plastic belts were constructed using the same belt and sprocket material, but different rod materials. The hinge pin materials tested were acetal, nylon, polypropylene, and urethane-coated acetal. The initial belt pitch was measured for each material combination. The belts were then installed onto a conveyor that resides inside a sealed tank. Water and sand were added to simulate the environment commonly seen in abrasive field applications. A load was applied to the belt so as to allow the loading to remain constant, regardless of belt wear. The conveyor was allowed to run for a set period of time, 22 hours in these tests, after which the belt was removed and the final belt pitch was measured and recorded. The final pitch was then compared to the initial pitch in order to determine the percent increase in pitch. With an elongation of only 0.68%, the urethane-covered acetal pin, the urethane tube of which had a hardness of 75 Shore A, outperformed the hinge pins made of conventional materials. Test results not tabulated in Table I showed that a hinge pin with a urethane hardness of 85 Shore A elongated 1.11%. Experience with urethane in other conveyor belt applications suggests a preferred hardness of the urethane between about 50 Shore A and 95 Shore A, with about 70 Shore A most preferred.

Further tests were performed to determine the preferred method of affixing the tube to the interior rod. Tested were hinge pins in which: 1) the urethane tube was rigidly attached to the interior rod, i.e., bonded together along their lengths (bonded); 2) the ends of the urethane tube were sealed to prevent contaminants from entering the space between the unbonded rod and the tube (sealed ends); and 3) the ends of the urethane tube were left open to allow contaminants to enter the space between the unbonded rod and the tube (open ends). All the hinge pins tested were made by spraying the rigid rod material with a silicon-based lubricant and pulling the rod through the urethane tube. The results of these tests are shown in Table II.

TABLE II

| Method of Affixing Tube to Rod | Percent Elongation in Pitch |
| --- | --- |
| 1) Bonded | 1.4% |
| 2) Sealed Ends | 0.3% |
| 3) Open Ends | 0.1% |

As the results of all the testing indicate, a urethane tube surrounding the rod significantly reduces the friction between the walls of the hinge elements and the hinge rod. The tube preferably has a thickness of between about 1/64 inch (0.4 mm) and 3/32 inch (2.4 mm), with 1/32 inch (0.8 mm) being a preferred thickness. Although the tube may be bonded to the rod, such as through an extrusion or co-extrusion process or by a coating process or by an injection or co-injection molding process, superior performance was achieved when the tube was not bonded to the interior rod. It is theorized that the contaminants migrating into the space between the interior rod and the urethane tube acted as a lubricant that minimized friction on the interior rod.

The invention has been described in detail with respect to a preferred version, but the scope of the claims should not be limited to the description of the preferred version.

What is claimed is:

1. A hinge pin for hingedly interconnecting adjacent rows of plastic belt modules through aligned apertures in interleaved hinge elements of adjacent rows, the hinge pin comprising:

an interior rod made of a rigid material; and an outer tube surrounding the interior rod, wherein the outer tube is made of urethane and wherein the hardness of the outer urethane tube is between about 50 Shore A and about 95 Shore A.

2. A hinge pin as in claim 1 wherein the outer tube and the interior rod are unbonded to each other.

3. A hinge pin as in claim 1 wherein the outer tube and the interior rod are bonded to each other.

4. A hinge pin as in claim 1 wherein the interior rod is made of a material selected from the group consisting of acetal, nylon, polypropylene, PVC, and steel.

5. A hinge pin as in claim 1 wherein the thickness of the outer tube is greater than about 1/64 inch (0.4 mm) and less than about 3/32 inch (2.4 mm).

6. A hinge pin as in claim 1 wherein the hardness of the outer urethane tube is about 70 Shore A.

7. A modular plastic conveyor belt comprising:

a series of rows of belt modules wherein each row includes at least one belt module extending from a first end to a second end in the direction of belt travel and including a first set of hinge elements along the first end and a second set of hinge elements along the second end, wherein the hinge elements form aligned apertures therethrough and wherein the rows are arranged end to end with the first set of hinge elements of a row interleaved with the second set of hinge elements of an adjacent row, the aligned apertures of the interleaved hinge elements defining a passageway between adjacent rows;

a hinge pin disposed in the passageway to form a hinge joint between adjacent rows, wherein the hinge pin includes:

an interior rod made of a rigid material; and an outer tube surrounding the interior rod, wherein the outer tube is made of urethane and wherein the hardness of the outer urethane tube is between about 50 Shore A and about 95 Shore A.

8. A modular plastic conveyor belt as in claim 7 wherein the outer tube and the interior rod are unbonded to each other.

9. A modular plastic conveyor belt as in claim 7 wherein the outer tube and the interior rod are bonded to each other.

10. A modular plastic conveyor belt as in claim 7 wherein the interior rod is made of a material selected from the group consisting of acetal, nylon, polypropylene, PVC, and steel.

11. A modular plastic conveyor belt as in claim 7 wherein the thickness of the outer tube is greater than about 1/64 inch (0.4 mm) and less than about 3/32 inch (2.4 mm).

12. A modular plastic conveyor belt as in claim 7 wherein the hardness of the outer urethane tube is about 70 Shore A.

13. A hinge pin for hingedly interconnecting adjacent rows of plastic belt modules through aligned apertures in interleaved hinge elements of adjacent rows, the hinge pin comprising:

an interior rod made of a rigid material; and an outer tube made of a soft urethane material surrounding the interior rod, wherein the outer tube is largely unbonded to the interior rod, thereby forming space between the interior rod and the outer tube sufficient to admit contaminants that act as lubricants to minimize friction between the interior rod and the outer tube.

14. A hinge pin as in claim 13 wherein the interior rod is made of a material selected from the group consisting of acetal, nylon, polypropylene, PVC, and steel.

15. A hinge pin as in claim 13 wherein the thickness of the outer tube is greater than about $\frac{1}{64}$ inch (2.4 mm) and less than about $\frac{3}{32}$ inch (2.4 mm).

16. A hinge pin as in claim 12 wherein the hardness of the outer urethane tube is between about 50 Shore A and about 95 Shore A.

17. A hinge pin as in claim 16 wherein the hardness of the outer urethane tube is about 70 Shore A.

18. A modular plastic conveyor belt suitable for use in abrasive environments, the belt including adjacent rows of belt modules hingedly interconnected by hinge pins as in claim 13 received in aligned apertures through interleaved hinge elements of adjacent rows of plastic belt modules.

\* \* \* \* \*